(12) United States Patent
Kim

(10) Patent No.: US 7,787,060 B2
(45) Date of Patent: Aug. 31, 2010

(54) VIDEO APPARATUS AND METHOD OF CONTROLLING THE SAME

(75) Inventor: Hyo Sung Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 1172 days.

(21) Appl. No.: 11/378,296

(22) Filed: Mar. 20, 2006

(65) Prior Publication Data

US 2007/0046832 A1 Mar. 1, 2007

(30) Foreign Application Priority Data

Aug. 31, 2005 (KR) .................. 10-2005-0081023

(51) Int. Cl.
 H04N 5/63 (2006.01)
 H04N 5/52 (2006.01)
(52) U.S. Cl. ..................... 348/730; 348/678
(58) Field of Classification Search ............... 348/730, 348/725, 678, 728, 735, 679, 553, 554; H04N 3/27, H04N 5/44, 5/52, 5/63
 See application file for complete search history.

(56) References Cited

U.S. PATENT DOCUMENTS

| | | | | |
|---|---|---|---|---|
| 5,303,063 A * | 4/1994 | Kim et al. | ................... | 348/725 |
| 5,598,228 A * | 1/1997 | Saitoh | ................... | 348/725 |
| 6,847,404 B1 | 1/2005 | Jackson et al. | | |
| 6,904,274 B2 * | 6/2005 | Simmons et al. | ......... | 455/245.1 |
| 2002/0039153 A1 * | 4/2002 | Yoo | ........... | 348/730 |

FOREIGN PATENT DOCUMENTS

| | | |
|---|---|---|
| CN | 1083995 | 4/2000 |
| CN | 100479503 | 4/2009 |
| EP | 0 333 275 | 9/1989 |
| EP | 0 818 923 | 1/1998 |
| EP | 1 496 691 | 1/2005 |
| EP | 1496691 | 1/2005 |
| JP | 8065607 | 3/1996 |
| JP | 1020000003797 | 1/2000 |
| JP | 2002049348 | 2/2002 |
| JP | 2004151731 | 5/2004 |
| WO | WO9811657 | 3/1998 |
| WO | WO2005020418 | 5/2005 |

OTHER PUBLICATIONS

European Search Report dated Nov. 7, 2008.
Korean Office Action dated Nov. 15, 2007.

* cited by examiner

*Primary Examiner*—Sherrie Hsia
(74) *Attorney, Agent, or Firm*—Ked & Associates LLP

(57) ABSTRACT

A video apparatus having a display module and a method of controlling the same are provided, whereby an electric field strength or automatic gain control (AGC) signal is recognized from a received broadcast signal and a power supply mode of the display module is controlled according to a level of the recognized AGC signal, to prevent an overheating of the display module without using an additional device. The video apparatus includes a display module for displaying a broadcast signal received via a broadcast channel, the display module being selectively driven according to one of a plurality of power supply modes; and a controller for controllably setting the power supply mode of the display module according to the strength of an electric field of the received broadcast signal, the controller maintaining the set power supply mode if the electric field strength lies between lower and upper thresholds defining a threshold region.

35 Claims, 3 Drawing Sheets

VIDEO APPARATUS AND METHOD OF CONTROLLING THE SAME

This application claims the benefit of Korean Patent Application No. 10-2005-0081023, filed on Aug. 31, 2005, which is hereby incorporated by reference as if fully set forth herein.

BACKGROUND OF THE INVENTION

1. Field of the Invention

The present invention relates to a video apparatus, and more particularly, to a video apparatus having a display module and a method of controlling a power supply mode of the display module, in which an automatic gain control (AGC) value is obtained based on the signal strength of a received broadcast signal.

2. Discussion of the Related Art

A video apparatus receives a signal, which typically includes separable audio and video signals, from a specific source, e.g., a broadcast channel, and extracts the video signal from the received signal. The video signal is then separately processed for display on a display module such as a cathode ray tube, liquid crystal display, or plasma display panel (PDP) module. The PDP module, which is being increasingly adopted as the display module for application in consumer televisions, has a basic structure enabling the fabrication of a much thinner device than a video apparatus employing a cathode ray tube and exhibits better luminance characteristics than a video apparatus employing a liquid crystal display.

Referring to FIG. 1, in addition to a PDP module, a contemporary video apparatus comprises a tuner 110 for selecting (tuning) a specific broadcast signal from among a plurality of broadcast signals received via an antenna or input means; a demultiplexer 120 for separating the specific broadcast signal as received into its component signals, including at least a video signal and typically including an audio signal and related channel information; a video processor 130 for processing the video signal to be displayed on the PDP module 140; and a controller 150 for controlling the respective blocks according to input commands, which include at least an input for broadcast channel selection, typically made by a user.

In the operation of the above video apparatus, with the device powered to enable a broadcast channel selection, either by a default condition or by a specific user input, the controller 150 outputs to the tuner 110 a control signal for tuning the specified broadcast channel, and in doing so, the tuner selects and outputs a received broadcast signal of the frequency of a specified channel. The selected broadcast signal of the specified channel is input to the demultiplexer 120 to be separated into a video signal, an audio signal, and additional information. If the specified channel contains a video signal, the demultiplexer 120 outputs the video signal to the video processor 130, which processes the received video signal to enable its display on the PDP module 140.

In practice, however, the strength of the electric field of the received video signal, i.e., the input signal strength, may abruptly vary over time, particularly in a hysteresis region relative to the varying strength, such that a power supply mode for driving the PDP module is subject to excessively frequent changes, in which case an internal temperature of the video apparatus may also exceed acceptable limits. Unduly high internal temperatures may also result if, for a particular channel, a received video signal has a weak electric field strength or there is no signal input, while viewing of the broadcast signal of the channel continues. In particular, a television tends to become overheated in the presence of the input of a weak RF signal or one exhibiting a high level of white noise. To overcome such an overheating phenomenon, contemporary video apparatuses, particularly those utilizing PDP modules, employ heat-sinking techniques for the PDP module and special components that are resistant to high temperature conditions, to accommodate a larger margin of heating tolerance, which leads to substantially increased product costs.

SUMMARY OF THE INVENTION

Accordingly, the present invention is directed to a video apparatus and a method of controlling the same that substantially obviates one or more problems due to limitations and disadvantages of the related art.

An object of the present invention is to provide a video apparatus and a method of controlling the same, by which overheating attributable to rapid fluctuations in the electric field strength of a received video signal can be prevented.

Another object of the present invention is to provide a video apparatus and a method of controlling the same, by which overheating attributable to a reception of a weak or non-broadcast signal can be prevented.

Another object of the present invention is to provide a video apparatus and a method of controlling the same, by which power consumption may be reduced.

Another object of the present invention is to provide a video apparatus and a method of controlling the same, which facilitates lower fabrication costs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a video apparatus comprising a display module for displaying a broadcast signal received via a broadcast channel, the display module being selectively driven according to one of a plurality of power supply modes; and a controller for controllably setting the power supply mode of the display module according to the strength of an electric field of the received broadcast signal, the controller maintaining the set power supply mode if the electric field strength lies between lower and upper thresholds defining a threshold region.

The video apparatus according to the present invention may comprise a tuner for receiving a broadcast signal, to generate an AGC signal having a value correlating to the signal strength of the received broadcast signal; a display module for displaying the received broadcast signal, the display module being selectively driven according to one of a plurality of power supply modes; and a controller for controllably setting the power supply mode of the display module according to the AGC value, the controller maintaining the set power supply mode if the AGC value lies between lower and upper thresholds defining a threshold region.

The video apparatus of the present invention may also comprise a tuner for receiving a broadcast signal, to generate an AGC signal having a value correlating to the signal strength of the received broadcast signal; a demultiplexer for extracting a video signal from the received broadcast signal; a video processor for processing the video signal to enable display; a plasma display panel module for displaying the processed video signal; a controller for outputting a control signal for controllably setting a current power supply mode of the plasma display panel module according to the AGC value, the controller maintaining the set power supply mode if the AGC value lies between lower and upper thresholds defining a threshold region; and a driver for driving the plasma display panel module according to the power supply mode corresponding to the control signal According to another aspect of the present invention, there is provided a method of controlling a power supply mode in a video apparatus having a display module. The method comprises detecting an electric field strength of a received broadcast signal; and setting a power supply mode of the display module according to the detected electric field strength, whereby the power supply mode setting maintains the setting of the power supply mode if the detected electric field strength lies between upper and lower thresholds defining a threshold region.

The method of the present invention may comprise detecting an AGC signal having a value correlating to an electric field strength of a received broadcast signal; comparing the detected AGC value to a reference threshold; determining a power supply mode of the display module based on results of the comparing; updating the AGC value in the determined power supply mode; and setting the determined power supply mode of the display module according to the updated AGC value, whereby the power supply mode setting maintains the setting of the power supply mode if the updated AGC value lies between upper and lower thresholds defining a threshold region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
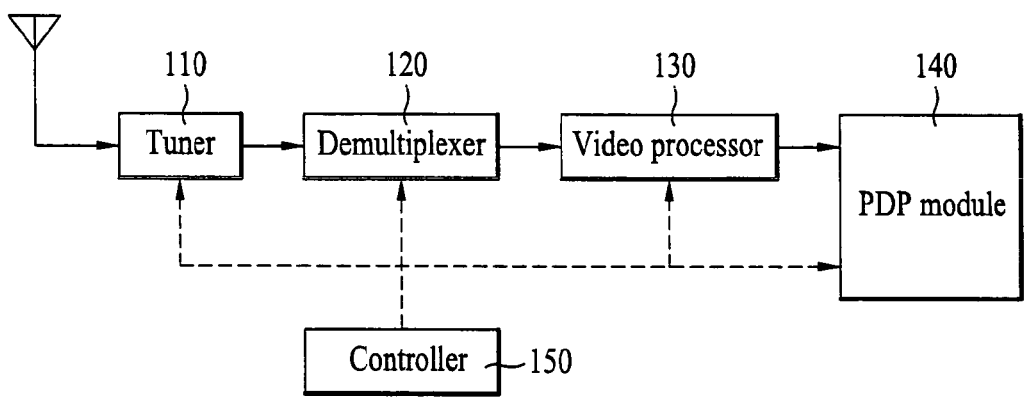
FIG. 1 is a block diagram of a contemporary video apparatus.

Reference will now be made in detail to exemplary embodiments of the present invention, examples of which are illustrated in the accompanying drawings. Wherever possible, like reference designations will be used throughout the drawings to refer to the same or similar parts.

The video apparatus controlling method of present invention is applicable to a video apparatus, such as a standard or commercially available television set, including a display module. Though the characteristic features of the present invention are applicable for any type of display module, the method is particularly suited to a video apparatus adopting a plasma display panel (PDP) module.

The basic structure of a PDP module includes an upper plate and a lower plate, which are joined together so as to form an interposing space between the upper and lower plates. The upper plate may comprise a substrate; a parallel arrangement of corresponding scan and sustain electrodes formed on the substrate; a dielectric layer formed over the substrate including the scan and sustain electrodes; and a passivation layer formed on the dielectric layer. The lower plate may comprise a substrate; a plurality of address electrodes formed on the substrate; a dielectric layer formed on the substrate including the address electrodes; a plurality of barrier ribs formed on the dielectric layer to be arranged between the address electrodes; and layers of a fluorescent substance respectively formed, within each of an array of discharge cells, to coat surfaces of the barrier ribs and dielectric layer. A discharge region is formed between the upper and lower plates by filling in the interposing space with a discharge gas mixture of helium, xenon, or other inert gas. When a set of predetermined voltages are selectively applied to the various electrodes according to an image signal, the discharge gas generates a pattern of ultraviolet light, which excites the fluorescent substance to generate a color image. The predetermined voltages, applied to the electrodes according to a charge/discharge timing, may be supplied to the PDP module via a module driver.

According to the present invention, a PDP module having, for example, a configuration as above may be driven in any one of a plurality of power supply modes, or power modes, including at least a low-power mode in addition to a normal-power mode. The low-power mode, or first power mode, utilizes a power supply operating at a lower voltage than the normal-power mode, or second power mode.

Meanwhile, a video apparatus according to the present invention may be connected to a tuner for receiving a broadcast signal on at least one of a plurality of broadcast channels or may comprise the tuner, such that the video apparatus receives a tuned input signal and processes the received signal for display or receives all of the broadcast signals of each of the plurality of broadcast channels and selects one signal for display processing. The video apparatus may include means for manually selecting a desired channel from among the plurality of broadcast channels, i.e., according to a user command, or may receive an externally generated tuning command for tuning to the frequency band of a specific broadcast channel. The broadcast signal as received or input to the video apparatus according to the present invention inherently varies in strength, that is, the strength of the electric field of the signal carried via the specific broadcast channel, and the tuner used by the video apparatus of the present invention enables a generation of an automatic gain control (AGC) signal that varies in relationship to the signal strength of the received broadcast channel. In the following description of the present invention, a weak broadcast signal is a signal having a relatively low-energy electric field, and a non-broadcast signal is a broadcast signal that cannot be discriminated from a noise floor at the tuned frequency and thus may indicate the presence of a broadcast signal that includes a prohibitively high level of white noise or simply the absence of an input signal. Thus, conditions determining a weak broadcast signal substantially coincide with the conditions for determining a non-broadcast signal.

According to the present invention, the power mode of the PDP module is controllably selected, from among the plurality of power supply modes, based on the current value of the AGC signal. In other words, the power mode can be set according to the current strength of the broadcast signal.

Figure 2:
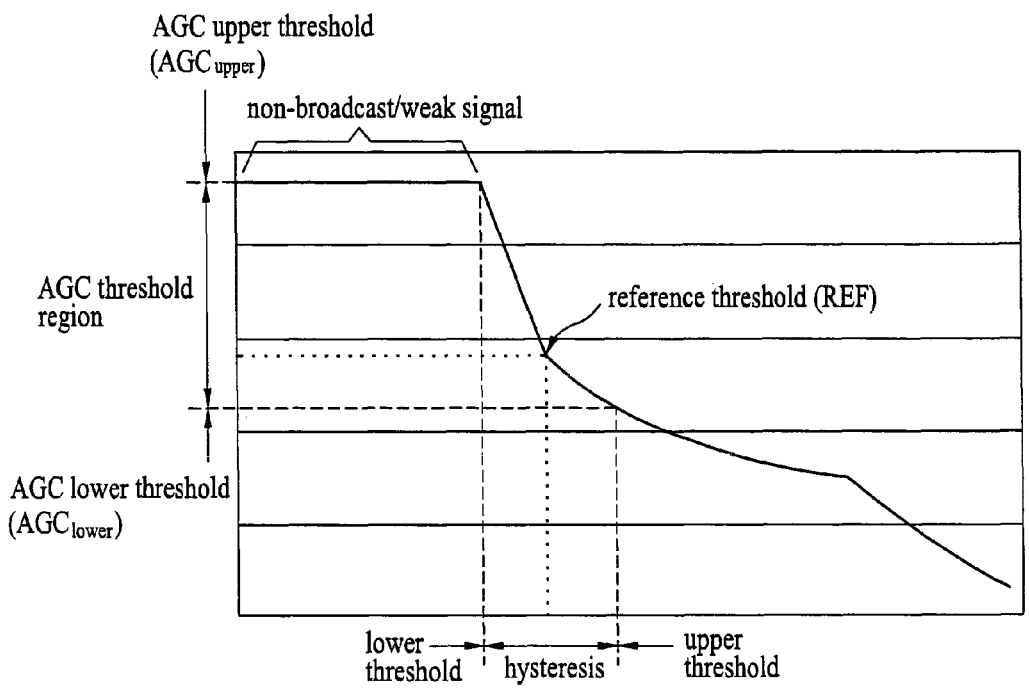
FIG. 2 is a graph plotting the value of an AGC signal generated according to the current strength of a broadcast signal received in a video apparatus adopting the method of the present invention.

FIG. 2 shows the relationship between the AGC signal and the received signal strength, according to an exemplary embodiment of the present invention, in which the electric field strength of a broadcast signal is inversely proportional to an AGC signal. Here, the ordinate (y) axis of the graph is graduated according to the value of the generated AGC signal, using, for example, an 8-bit AGC signal enabling a scale of at least 250 discrete AGC levels, and the abscissa (x) axis of the graph is graduated according to the strength of the broadcast signal as received by the tuner and expressed in, for example, dB($\mu$V), whereby a hysteresis section of, for example, approximately 20 dB($\mu$V) exists near the horizontal center of the plot. The hysteresis section spans the range where the electric field strength of a broadcast signal experiences its most abrupt changes with respect to time. Since the AGC signal is generated based on a varying signal strength, if a change in power mode is based solely on AGC value, the power mode could, upon being set to a desired mode according to an AGC value corresponding to the hysteresis section, be too quickly reverted to its previous state, which could lead an overheating of a video apparatus. In other words, by selecting a power mode of a PDP module based strictly on a currently determined AGC value, a video apparatus is especially susceptible to the overheating phenomenon for a received broadcast signal experiencing hysteresis. Hence, in the present invention, there is no switching of the power supply mode while the broadcast signal is of a strength may be reflective of hysteresis.

Therefore, the video apparatus of the present invention essentially includes a display module for displaying a received broadcast signal and a controller for controllably setting a power mode of the display module according to the strength of the received broadcast signal. In doing so, the controller sustains the previous power mode setting, that is, performs no specific power mode selection, as long as the signal strength exists within a reference threshold region, which is defined between a lower threshold and an upper threshold and corresponds to the hysteresis range existing between analogous upper and lower limits.

As shown in FIG. 2, a non-broadcast/weak signal is a broadcast signal having an electric field strength less than or equal to (i.e., not greater than) the lower threshold and corresponds to a broadcast signal having an AGC signal higher the upper AGC limit, i.e., the AGC upper threshold. Therefore, in an initial activity such as a power-on operation of the video apparatus and its tuner or a subsequent selection of a broadcast channel, a reference level for determining power mode selection and control is determined. This reference level is a single point within the hysteresis section, which corresponds to a signal strength that lies between threshold extremes, i.e., the threshold region. In this case, the reference level (REF) is predetermined as one value within the AGC threshold region, which is defined between an AGC lower threshold (AG-$C_{lower}$) and an AGC upper threshold (AGC$_{upper}$). That is, in the present invention, the hysteresis section of the graph is defined as an electric field strength threshold region (or a threshold region of the AGC signal) defined between upper and lower thresholds.

Figure 3:
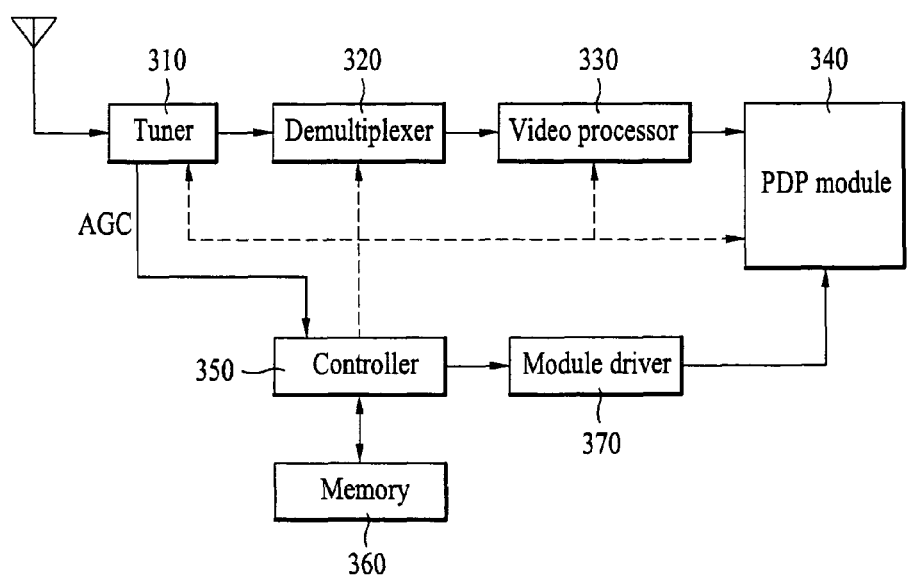
FIG. 3 is a block diagram of a video apparatus according to the present invention.

Referring to FIG. 3, a video apparatus according to the present invention comprises a tuner 310 for selecting (tuning) and outputting a specific broadcast signal from among a plurality of broadcast signals received via an antenna or input means and for generating an automatic gain control (AGC) signal relative to the strength of the selectively received broadcast signal; a demultiplexer 320 for separating the specific broadcast signal as received into its component signals, including at least a video signal and typically including an audio signal and related channel information; a video processor 130 for processing the video signal to be displayed; a PDP module 340 for displaying the processed video signal; and a controller 150 for controlling the respective blocks according to input commands, which include at least an input for broadcast channel selection, typically made by a user, and for generating a control signal for setting the power mode of the PDP module according to a level (value) of the AGC signal of the received broadcast signal and thereby controllably setting the power supply mode of the display module according to the strength of an electric field of the received broadcast signal and maintaining the set power supply mode if the electric field strength lies between lower and upper thresholds defining a threshold region; a memory 360 for storing AGC and reference values for use in performing relative comparisons; and a module driver 370 for driving the PDP module under conditions of a power mode set by the control signal output from the controller.

The video apparatus of the present invention uses the value of the AGC signal as a reference signal for setting an initial power mode and an updated AGC value for determining whether to perform a new power mode selection, that is, for changing the initially determined power mode. Alternatively, since the above AGC values are correlative to the electric field strength of the received broadcast signal, which may vary with respect to time, the power mode setting and selection may also be determined using a received signal strength.

Meanwhile, the control signal output from the controller 350 corresponds to a power mode providing a supply power of a level that is substantially in inverse proportion to that of the AGC signal. In other words, if the level of the AGC signal is high, the controller 350 generates a control signal corresponding to a low-power mode, and the module driver 370 drives the PDP module 340 accordingly; conversely, if the level of the AGC signal is low, the controller generates a control signal corresponding to a higher-power mode, namely, the normal-power mode, and the PDP module is driven accordingly.

Figure 4:
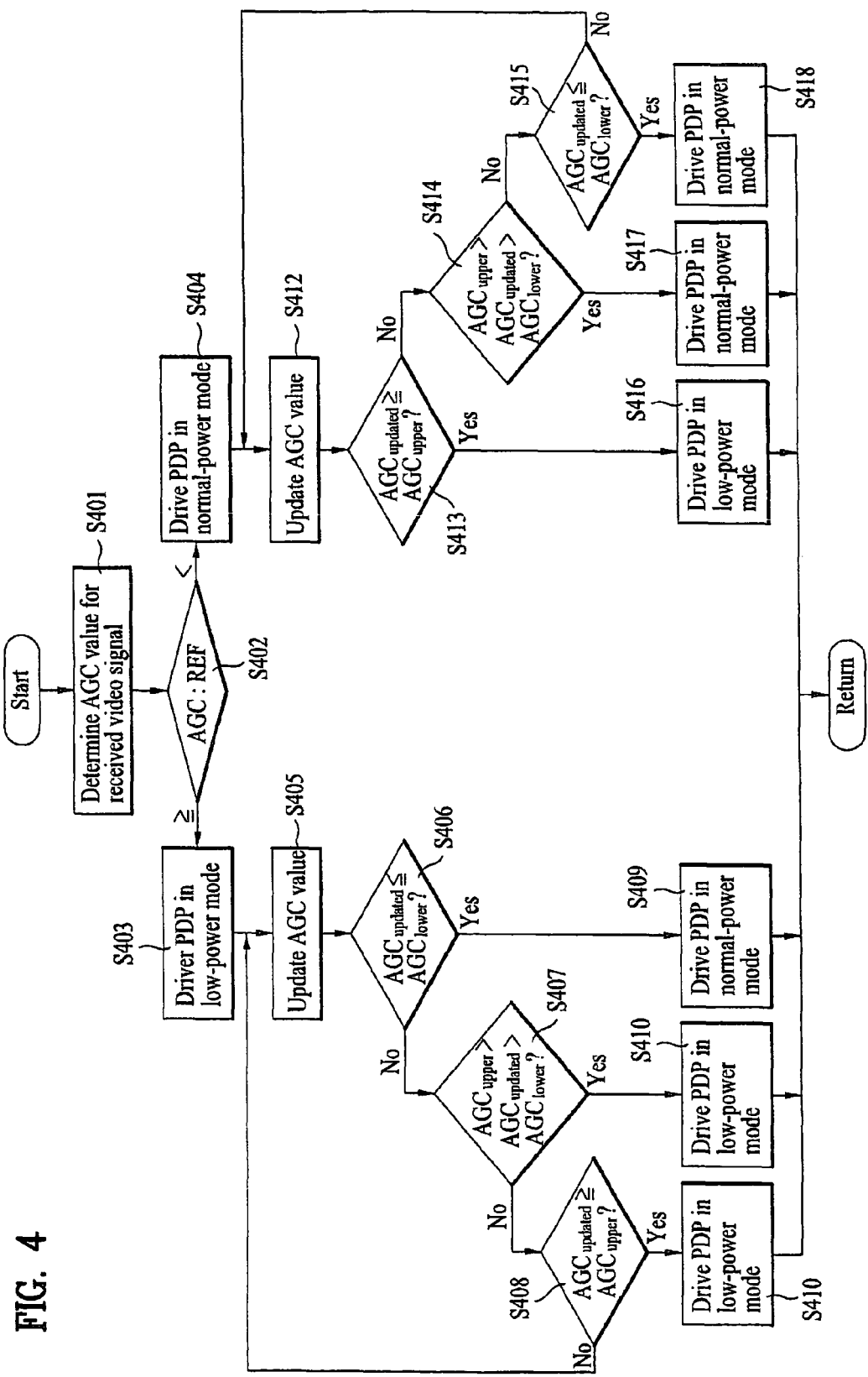
FIG. 4 is a flowchart of a method of controlling a power supply mode in a video apparatus according to the present invention.

FIG. 4 illustrates the flow of a subroutine, executed by the controller 350, for controllably varying a power supply mode, and specifically, for setting the control signal output from the controller 360 to drive the PDP module 340 via the module driver 370, which thereby determines a power supply mode of the PDP module according to an operation of a video apparatus adopting the method of the present invention.

Referring to FIG. 4, with the video apparatus powered, the controller 350 specifies a channel by outputting a control signal to the tuner 310, which receives a broadcast signal at the frequency of the specified channel. In doing so, an automatic gain control (AGC) value is determined according to the strength of the electrical field at the tuned frequency (S401). Thus, the AGC value determining step S401 includes an instance of reception of the broadcast signal via the tuner 310. The current value, AGC or AGC$_{updated}$, is then stored in the memory 360 for comparison by the controller 350 with various reference values, such as REF, AGC$_{lower}$, and AGC$_{upper}$, which are determined according to system characteristics and may be prestored in the memory. In a step S402, the AGC value of the broadcast signal as received by the tuner 310 is compared to the value of the reference threshold (REF) shown in FIG. 2, to determine an initial power mode setting. Thus, if AGC is greater than or equal to (i.e., not less than) REF, it is determined that the broadcast signal is a non-broadcast or weak signal, the controller 350 sets the power mode of the PDP module 340 to the low-power mode, and the PDP module 340 is driven via the module driver 370 accordingly (S403). Otherwise, namely, if AGC is less than REF, it is determined that the broadcast signal is a signal having a relatively strong electric field, the controller 350 sets the power mode of the PDP module 340 to the normal-power mode, and the PDP module 340 is driven via the module driver 370 accordingly (S404)

When the power mode is initially determined in the step S402 as a low-power mode, the AGC value of the received broadcast signal is updated continually based on the currently received broadcast signal (S405). With the power mode of the PDP module 340 thus set to the low-power mode, a series of comparisons (S406, S407, S408) is performed to determine whether to switch the power mode to the normal-power mode or to sustain the low-power mode setting. Thus, if the updated AGC value, $AGC_{updated}$, is less than or equal to (i.e., not greater than) a lower threshold of the AGC value, $AGC_{lower}$, the power mode of the PDP module 340 is set, or switched, to the normal-power mode (S409). Conversely, if $AGC_{updated}$ is greater than $AGC_{lower}$, the power mode remains set to the low-power mode (S410, S411). That is, though the updated AGC value may vary according to a currently received broadcast signal, as long as the value of $AGC_{updated}$ varies within the confines of the AGC threshold region of FIG. 2, or if it rises to an upper threshold of the AGC value, $AGC_{upper}$, the controller 350 continues to output a control signal corresponding to the low-power mode. Here, without the current value of $AGC_{updated}$ reaching as high as the value of $AGC_{upper}$ in the step S408, the AGC value continues to be determined (updated) according to the current signal strength of the broadcast signal as received by the tuner 310.

Meanwhile, when the power mode is initially determined in the step S402 as a normal-power mode, the AGC value of the received broadcast signal is likewise updated continually based on the currently received broadcast signal (S412). With the power mode of the PDP module 340 thus set to the normal-power mode, a series of comparisons (S413, S414, S415) is performed to determine whether to switch the power mode to the low-power mode or to sustain the normal-power mode setting. Thus, if the updated AGC value, $AGC_{updated}$, is greater than or equal to (i.e., not less than) an upper threshold of the AGC value, $AGC_{upper}$, the power mode of the PDP module 340 is set, or switched, to the low-power mode (S416). Conversely, if $AGC_{updated}$ is less than $AGC_{upper}$, the power mode remains set to the normal-power mode (S417, S418). That is, though the updated AGC value may vary according to a currently received broadcast signal, as long as the value of $AGC_{updated}$ varies within the confines of the AGC threshold region of FIG. 2, or if it falls to the lower threshold of the AGC value, $AGC_{lower}$, the controller 350 continues to output a control signal corresponding to the normal-power mode. Here, without the current value of $AGC_{updated}$ reaching as low as the value of $AGC_{lower}$ in the step S415, the AGC value continues to be determined (updated) according to the current signal strength of the broadcast signal as received by the tuner 310.

Though the example shown in FIG. 4 is a method of controlling a power mode of a PDP module based on the AGC value, the same basic flow may be used to control the power mode based on the strength of the broadcast signal, since the AGC values obtained according to the method of the present invention have been shown, as in FIG. 2, to be relative to received signal strength. That is, while the controller 350 may as in FIG. 4 set the power mode to a low-power mode for an AGC signal of at least equal (or higher) value with respect to the AGC upper threshold and to a normal-power mode for an AGC signal of at least equal (or lower) value with respect to the AGC lower threshold, the controller may also use the broadcast channel's signal strength directly, to set the power mode to a low-power mode for the low signal strength in comparison to a threshold range and to a normal-power mode for a higher signal strength in comparison to the threshold range.

As described above, the method of the present invention determines an initial AGC value for an input broadcast signal, compares the initial AGC value to a predetermined reference value (REF), and then drives a PDP module in one of a plurality of power modes, including a low-power mode and a normal-power mode, according to a result of the comparison. While the PDP module is being thus driven, that is, after initially determining an appropriate AGC value for a broadcast signal input via a tuner, the AGC value is periodically updated based on the strength of the currently input signal, the AGC value is repeatedly determined and thereby periodically updated. If the updated AGC value varies within a predetermined AGC threshold region, corresponding to a range of signal strengths exhibiting hysteresis characteristics, the current power mode is maintained (i.e., without change), since this region is subject to an AGC value that changes too rapidly or frequently. Hence, overheating of the video apparatus, due to rapid power mode changes, can be prevented. Moreover, a transient phenomenon, whereby a PDP module flickers with minute variations in the AGC value with respect to one threshold value, can also be prevented. That is, if the AGC value deviates from a predetermined AGC threshold region, to exceed an upper limit of the AGC threshold region, it is determined that an internal temperature of the video apparatus has risen and the PDP module is driven in a low-power mode, so that when a radio frequency (RF) noise signal is received together with a weak video signal, an undue temperature rise in the display module can be prevented. On the other hand, if the AGC value deviates from the predetermined AGC threshold region, to drop below a lower limit of the AGC threshold region, it is determined that the received video signal is strong and the display module is driven in a normal-power mode.

Accordingly, by adopting the method of the present invention, power consumption can be reduced in a video apparatus having a display module and a tuner tuned to a broadcast frequency by recognizing a weak or absent signal at the tuner to enable an improved power mode selection, whereby a controlled selection of a power mode of the display module is based on the presence of such a broadcast signal. In addition, since the presence of low-energy signals at the tuner may create a potential for overheating the video apparatus, and since a condition for potential overheating can be detected by a video apparatus adopting the method of the present invention, whereby the display module's power mode is controlled accordingly, an overheating phenomena of the video apparatus can be prevented with no special means or additional device, e.g., special high-temperature-resistant components or heat-sinking for the PDP module. That is, overheating conditions are detected using only an AGC signal, another control signal that is responsive to the strength of a received broadcast signal, or the electrical field strength of the received broadcast signal itself, thereby enabling enhanced reliability of a video apparatus without increasing product costs.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A video apparatus, comprising:
 a display module for displaying a broadcast signal received via a broadcast channel, said display module being selectively driven according to one of a plurality of power supply modes; and
 a controller for controllably setting the power supply mode of said display module according to a strength of an electric field of the received broadcast signal, said controller maintaining a previously set power supply mode if the electric field strength lies between a lower threshold and an upper threshold defining a threshold region.

2. The video apparatus of claim 1, wherein said controller initially sets the power supply mode to one of a first mode or a second mode based on a comparison of the electric field strength of the received broadcast signal with a reference threshold.

3. The video apparatus of claim 2, wherein, if the electric field strength is not less than the upper threshold, the power supply mode is switched from the first mode to the second mode and wherein, if the electric field strength is not greater than the lower threshold, the power supply mode is switched from the second mode to the first mode.

4. The video apparatus of claim 2, wherein the first mode is a low-power mode and wherein the second mode is a normal-power mode.

5. The video apparatus of claim 1, wherein the low-power mode is set for a broadcast signal determined to be a weak broadcast signal.

6. The video apparatus of claim 5, wherein the broadcast signal is determined to be a weak broadcast signal if the electric field strength is not greater than the lower threshold.

7. The video apparatus of claim 1, wherein the threshold region occurs where the electric field of the broadcast signal exhibits hysteresis.

8. The video apparatus of claim 1, wherein said display module is a plasma display panel module.

9. The video apparatus of claim 1, wherein said controller is connected to a tuner for receiving the broadcast signal and wherein said controller receives an automatic gain control (AGC) signal having a value correlating to the signal strength of the received broadcast signal.

10. The video apparatus of claim 9, wherein said controller initially sets the power supply mode to one of a first mode and a second mode based on a comparison of the AGC value of the received broadcast signal with a reference threshold.

11. The video apparatus of claim 10, wherein, if the AGC value is not greater than the lower threshold, the power supply mode is switched from the first mode to the second mode and wherein, if the AGC value is not less than the upper threshold, the power supply mode is switched from the second mode to the first mode.

12. The video apparatus of claim 10, wherein the first mode is a low-power mode and wherein the second mode is a normal-power mode.

13. The video apparatus of claim 12, wherein the low-power mode is set for a broadcast signal determined to be a weak broadcast signal.

14. The video apparatus of claim 13, wherein the broadcast signal is determined to be a weak broadcast signal if the AGC value is not greater than the lower threshold.

15. The video apparatus of claim 1, further comprising:
 a tuner for receiving a broadcast signal, to generate an automatic gain control (AGC) signal having a value correlating to the signal strength of the received broadcast signal.

16. The video apparatus of claim 15, wherein said display module is a plasma display panel module.

17. The video apparatus of claim 1, wherein the power supply mode is set to a power supply mode having a supply power in inverse proportion to the AGC value.

18. The video apparatus of claim 1, wherein said controller outputs to said display module a drive control signal for selectively setting the power supply mode to one of the plurality of power supply modes.

19. The video apparatus of claim 18, wherein the output control signal corresponds to a power supply mode having a supply power in inverse proportion to the AGC value.

20. The video apparatus of claim 19, wherein, if the value of the AGC signal is high, the display module is operated in a low-power mode and wherein, if the value of the AGC signal is low, the display module is operated in a normal-power mode.

21. The video apparatus of claim 1, further comprising:
 a driver for driving the plasma display panel module according to the power supply mode corresponding to a drive control signal output from said controller for selectively setting the power supply mode to one of the plurality of power supply modes.

22. The video apparatus of claim 1, further comprising:
 a tuner for receiving a broadcast signal, to generate an automatic gain control (AGC) signal having a value correlating to the signal strength of the received broadcast signal;
 a demultiplexer for extracting a video signal from the received broadcast signal;
 a video processor for processing the video signal to enable display;
 wherein said display module is a plasma display panel module for displaying the processed video signal, and
 said controller for outputting a control signal for controllably setting a current power supply mode of said plasma display panel module according to the AGC value, said controller maintaining the set power supply mode if the AGC value lies between lower and upper thresholds defining a threshold region; and
 a driver for driving said plasma display panel module according to the power supply mode corresponding to the control signal.

23. The video apparatus of claim 1, wherein power is provided in both of the first mode and the second mode at varying non-zero levels.

24. A method of controlling a power supply mode in a video apparatus having a display module, the method comprising:
 detecting an electric field strength of a received broadcast signal; and
 setting a power supply mode of the display module according to the detected electric field strength, whereby said power supply mode setting maintains the setting of the power supply mode if the detected electric field strength lies between an upper threshold and a lower threshold defining a threshold region.

25. The method of claim 24, wherein the display module is selectively driven according to one of a plurality of power supply modes.

26. The method of claim 24, wherein the power supply mode is initially set to one of a first mode or a second mode based on a comparison of the electric field strength of the received broadcast signal with a reference threshold.

27. The method of claim 26, wherein, if the electric field strength is not less than the upper threshold, the power supply mode is switched from the first mode to the second mode and wherein, if the electric field strength is not greater than the lower threshold, the power supply mode is switched from the second mode to the first mode.

28. The method of claim 26, wherein the first mode is a low-power mode and wherein the second mode is a normal-power mode.

29. The method of claim 28, wherein the low-power mode is set for a broadcast signal determined to be a weak broadcast signal.

30. The method of claim 29, wherein the broadcast signal is determined to be a weak broadcast signal if the electric field strength is not greater than the lower threshold.

31. The method of claim 24, wherein the display module is a plasma display panel module.

32. The method of claim 24, further comprising:
   detecting an automatic gain control (AGC) signal having a value correlating to an electric field strength of a received broadcast signal;
   comparing the detected AGC value to a reference threshold;
   determining a power supply mode of the display module based on results of said comparing;
   updating the AGC value in the determined power supply mode; and
   setting the determined power supply mode of the display module according to the updated AGC value, whereby said power supply mode setting maintains the setting of the power supply mode if the updated AGC value lies between an upper threshold and a lower threshold defining a threshold region.

33. The method of claim 32, said power supply mode determining comprising:
   selecting a low-power mode as the determined power supply mode if the detected AGC signal has a value not less than the reference threshold; and
   selecting a normal-power mode as the determined power supply mode if the detected AGC signal has a value less than the reference threshold.

34. The method of claim 33, wherein, if the determined power supply mode is the low-power mode, said power supply mode setting comprising:
   sustaining the low-power mode, if the updated AGC value is greater than the upper threshold and lies within the threshold region; and
   changing the low-power mode into the normal-power mode, if the updated AGC value is not greater than the lower threshold.

35. The method of claim 33, wherein, if the determined power supply mode is the normal-power mode, said power supply mode setting comprising:
   sustaining the normal-power mode, if the updated AGC value is less than the lower threshold and lies within the threshold region; and
   changing the normal-power mode into the low-power mode, if the updated AGC value is not less than the upper threshold.

* * * * *